(12) United States Patent
Allan et al.

(10) Patent No.: US 7,734,475 B2
(45) Date of Patent: Jun. 8, 2010

(54) FRAMES-BASED ADVERTISING SERVICE WITH RESPONSE AND ACTIVITY REPORTING

(75) Inventors: Scott T. Allan, Burlingame, CA (US); Tiffany Pai, Emerald Hills, CA (US); J. Gregory Stout, Sunnyvale, CA (US); Xin Zhao, Cupertino, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 12/043,591

(22) Filed: Mar. 6, 2008

(65) Prior Publication Data
US 2008/0154708 A1 Jun. 26, 2008

Related U.S. Application Data

(62) Division of application No. 09/653,767, filed on Sep. 1, 2000, now Pat. No. 7,356,477.

(51) Int. Cl.
G06Q 99/00 (2006.01)
(52) U.S. Cl. .................................... 705/1.1; 705/14.65
(58) Field of Classification Search .............. 705/1, 705/1.1, 14.65
See application file for complete search history.

(56) References Cited

U.S. PATENT DOCUMENTS 4,723,212 A 2/1988 Mindrum et al.

(Continued)

FOREIGN PATENT DOCUMENTS

EP 0 474 360 5/1992

(Continued)

OTHER PUBLICATIONS

Anonymous "@pos.com Unveils Internet Initiative for Web-Enabling Retail Point-of-Sale," PR Newswire, Jun. 29, 1999, 4 pages.

(Continued)

Primary Examiner—Jonathan Ouellette

(57) ABSTRACT

An advertising service divides a consumer transaction at a POS location into multiple time frames. The service then determines an advertisement (ad) for display in one of the time frames and displays the ad in one of the time frames. One of the time frames spans one of the following activities: waiting for a consumer to begin a transaction, greeting a consumer, beginning a transaction, selecting a form of payment, swiping a card for a form of payment, entering a security code for the form of payment, identifying a product for purchase, displaying a total cost for products identified for purchase, signing for a purchase, thanking a consumer his purchase, surveying a consumer, promoting an event, applying for a credit card, informing a consumer, identifying a consumer, interacting with a consumer, and passing through an interstitial period. Determining the ad for display in one of the time frames includes transmitting information about the transaction to an ad-management service that then determines the ad for display based on the transmitted information. A response indicates the determined ad. The service prioritizes multiple ads competing for display and determines the ad with highest priority as the ad for display. The service displays the ad in the one time frame or in a frame following the one time frame. The service advances from the one time frame into another time frame and repeats the determination and display with the other time frame.

12 Claims, 5 Drawing Sheets

U.S. PATENT DOCUMENTS

| | | |
|---|---|---|
| 4,825,045 A | 4/1989 | Humble |
| 4,833,308 A | 5/1989 | Humble |
| 4,910,672 A | 3/1990 | Off et al. |
| 4,949,256 A | 8/1990 | Humble |
| 5,025,372 A | 6/1991 | Burton et al. |
| 5,120,906 A | 6/1992 | Protheroe et al. |
| 5,144,115 A | 9/1992 | Yoshida |
| 5,173,851 A | 12/1992 | Off et al. |
| 5,256,863 A | 10/1993 | Ferguson et al. |
| 5,380,958 A | 1/1995 | Protheroe et al. |
| 5,448,044 A | 9/1995 | Price et al. |
| 5,459,306 A | 10/1995 | Stein et al. |
| 5,557,721 A | 9/1996 | Fite et al. |
| 5,561,282 A | 10/1996 | Price et al. |
| 5,612,868 A | 3/1997 | Off et al. |
| 5,642,485 A | 6/1997 | Deaton et al. |
| 5,739,512 A | 4/1998 | Tognazzini |
| 5,761,650 A | 6/1998 | Munsil et al. |
| 5,806,045 A | 9/1998 | Biorge et al. |
| 5,832,457 A | 11/1998 | O'Brien et al. |
| 5,892,827 A | 4/1999 | Beach et al. |
| 5,910,988 A | 6/1999 | Ballard |
| 5,915,007 A | 6/1999 | Klapka |
| 5,926,795 A | 7/1999 | Williams |
| 5,974,399 A | 10/1999 | Giuliani et al. |
| 6,009,411 A | 12/1999 | Kepecs |
| 6,026,370 A | 2/2000 | Jermyn |
| 6,047,269 A | 4/2000 | Biffar |
| 6,067,524 A | 5/2000 | Byerly et al. |
| 6,070,147 A | 5/2000 | Harms et al. |
| 6,076,068 A | 6/2000 | DeLapa et al. |
| 6,101,482 A | 8/2000 | DiAngelo et al. |
| 6,233,682 B1 | 5/2001 | Fritsch |
| 6,246,997 B1 | 6/2001 | Cybul et al. |
| 6,249,773 B1 | 6/2001 | Allard et al. |
| 6,317,650 B1 | 11/2001 | Powell et al. |
| 6,336,099 B1 | 1/2002 | Barnett et al. |
| 6,341,353 B1 | 1/2002 | Herman et al. |
| 6,401,074 B1 * | 6/2002 | Sleeper ........................ 705/14 |
| 6,415,261 B1 | 7/2002 | Cybul et al. |
| 6,424,949 B1 | 7/2002 | Deaton et al. |
| 6,443,839 B2 | 9/2002 | Stockdale et al. |
| 6,456,981 B1 * | 9/2002 | Dejaeger et al. .............. 705/14 |
| 6,490,602 B1 | 12/2002 | Kraemer |
| 6,543,683 B2 | 4/2003 | Hoffman |
| 6,540,137 B1 | 5/2003 | Forsythe et al. |
| 6,574,606 B1 | 6/2003 | Bell et al. |
| 6,598,026 B1 | 7/2003 | Ojha et al. |
| 6,609,106 B1 | 8/2003 | Robertson |
| 6,611,814 B1 | 8/2003 | Lee et al. |
| 2003/0095646 A1 | 5/2003 | Paschini |

FOREIGN PATENT DOCUMENTS

| | | |
|---|---|---|
| EP | 1 195 706 | 4/2002 |
| EP | 1 195 728 | 4/2002 |

OTHER PUBLICATIONS

Anonymous, "Tech Trends," Progressive Grocer, May 2000 (Abstract).

Bank, David "Electronic Commerce Debuts on Internet," Austin American Statesman, Apr. 12, 1994, p. E1.

Burke, R., "NCR: Internet Leaders Unite to Define Next Wave in E-Commerce," M2 Presswire, Jan. 20, 2000 (Abstract).

Clark, "A good idea on paper", Chain Store Age, Mar. 2000 (Abstract).

Ferguson, O., "NCR Lobbies for Digital Receipts,", Computer Dealer News, Apr. 21, 2000 (Abstract).

Gage, Deborah, "Sun: JavaWallet in pocket —Electronic wallet can organize, display transactions, credit data," Computer Reseller News, Aug. 26, 1996, p. 74.

Goradia et al., "NetBill 1994 Prototype," Carnegie Mellon University, 1994, 91 pages.

Sliwa, C., "E-Receipts on the retail front," Computerworld, Jan. 24, 2000 (Abstract).

Sporich, B., "Digital receipts could link retail stores, e-commerce," Video Store Magazine, Jan.-Feb. 2000 (Abstract).

Stock, H., "Not All Are Sold on Web Point of Sale Terminals," American Banker, Mar. 28, 2000 (Abstract).

* cited by examiner

FS

| 401 | 402 | 403 | 404 | 405 | 406 |

Piaget Piaget Piaget Piaget Piaget Piaget

FS'

| 401' | 402 | 403' | 404' | 405 | 406 |

GEtv Piaget McD's Super Piaget Piaget
              cuts

FIG. 4

FRAMES-BASED ADVERTISING SERVICE WITH RESPONSE AND ACTIVITY REPORTING

PRIORITY CLAIM

This application is a Divisional application of U.S. patent application Ser. No. 09/653,767 filed on Sep. 1, 2000 now U.S. Pat. No. 7,356,477 entitled "A Frames-Based Advertising Service with Response and Activity Reporting". The entire disclosure of the prior application is considered as being part of the disclosure of the accompanying application and hereby expressly incorporated by reference herein.

FIELD OF INVENTION

This invention relates to advertising at point-of-sale/service (POS) locations. More specifically, this invention relates to a remote data center serving customer-targeted advertising to POS system located near a customer for easy interaction with the customer.

BACKGROUND

Worldwide point-of-sale (POS) locations with electronic cash registers (ECRs) number an estimated seventeen million, eight million of which are in the United States. Retail POS sites account for two million of these locations, and the remaining six million are located in commercial banks, insurance agencies, hospitals, hotels, health-care providers, health clubs, etc. Approximately 300,000 are located in supermarket-like environments.

Estimates of the time a consumer typically spends at various point-of-sale/service (POS) platforms range from 30 seconds at convenience stores to 3.5 minutes at supermarkets. Assuming an average of 30 visits per day for the typical supermarket POS, such visits represent 9 million individuals per day captured at POS platforms for 3.5 minutes each time in the U.S.

Assuming four impressions per transaction and an average cost-of-media-per-thousand-impressions (CPM) rate of $10, a typical supermarket POS platform represents 120 impressions a day, for a value of $1.20. In the aggregate, the 300,000 U.S. supermarket POS platforms represent 36 million impressions in one day, for a value of nearly $130 million annually.

The opportunity of 36 million daily impressions may easily be squandered. Where the advertisements displayed at a POS location are random or at least uncoordinated with the transaction occurring at the POS, the advertising value of the impression may be substantially diminished or even lost completely.

Accordingly, it is desirable to use criteria of a transaction to determine what advertisement is displayed at the transacting POS location.

Also, it is desirable to coordinate the display of advertisement with the progress or stage of the transaction.

These and other goals of the invention will be readily apparent to one of skill in the art on reading the background above and the description below.

SUMMARY

Herein are described methods and apparatus for displaying advertisements ("ads") at a point-of-sale (POS) location. In various embodiments, the invention is as follows: An advertising service divides a consumer transaction at a POS location into multiple time frames. The service then determines an advertisement (ad) for display in one of the time frames and displays the ad in one of the time frames.

The transaction is divided into time frames, one of the time frames spanning one of the following transaction activities: waiting for a consumer to begin a transaction, greeting a consumer, beginning a transaction, selecting a form of payment, swiping a card for a form of payment, entering a security code for the form of payment, identifying a product for purchase, displaying a total cost for products identified for purchase, signing for a transaction, and thanking a consumer his purchase. Alternatively, each of the time frames may span one of the following activities: waiting for a consumer to begin a transaction, greeting a consumer, beginning a transaction, selecting a form of payment, swiping a card for a form of payment, entering a security code for the form of payment, identifying a product for purchase, displaying a total cost for products identified for purchase, signing for a purchase, thanking a consumer his purchase, surveying a consumer, promoting an event, applying for a credit card, informing a consumer, identifying a consumer, interacting with a consumer, and passing through an interstitial period.

The transaction may be a consumer-product or consumer-service transaction. The POS location of the transaction may be a bricks-and-mortar store or an e-commerce store.

Determining the ad for display in one of the time frames may include transmitting information about the transaction to an ad-management service and having the ad-management service determine the ad for display based on the transmitted information. A response indicates the determined ad. (The information transmission may be a broadcast to multiple ad-management services.)

Where the determined ad has an identifier, the indicative response may include the identifier for the determined ad and not the ad itself.

The service may cache an indicative response. Indeed, the service may store the indicative response and a targeting filter for the response. The service then subsequently applies the targeting filter to determine whether the determined ad indicated by the response is still appropriate for display.

The service may prioritize multiple ads competing for display and determine the ad with highest priority as the ad for display. Prioritizing processes include:

setting the priority of an ad for display when the transaction meets predetermined criteria (a "specific ad") to a priority higher than that of an ad for display when no such specific ad is available;

setting the priority of an ad for display that is for display without regard to specifics of the transaction and that originated in an ad-management service to a priority higher than that of an ad that is for display without regard to specifics of the transaction but that originated in a merchant;

setting the priority of an ad n time units long to a priority higher than that of an ad less than n time units long;

setting the priority of an interactive ad higher than that of a non-interactive ad;

setting the priority of an ad relating to an item identified for purchase to a priority higher than that of an ad related not to an item identified for purchase but to the POS location;

setting the priority of an ad relating to the POS location to a priority higher than an ad relating not to the POS location but to the time of a transaction;

setting the priority of an ad relating to the time of a transaction to a priority higher than that of an ad relating not to the time of a transaction but to the price of an item identified for purchase;

setting the priority of an ad that has n times been determined as the ad for display to a priority higher than that of an ad that has been determined as the ad for display more than n times;

adjusting the priority of an ad, the adjustment based on advertisements already displayed in the transaction;

adjusting the priority of an ad for display when the transaction meets predetermined criteria and that has already been displayed such that that ad does not display again in the transaction; and randomly setting the priority of an ad whose priority equals that of another ad to a priority higher than that of the priority of the other ad.

The service may additionally display the determined ad and determine the next highest-priority ad, if any, as the ad for display. Alternatively, the service may override the determination of the highest-priority ad as the ad for display—in one embodiment, at most once per transaction.

The service may reserve one of the time frames for ads for display without regard to transaction criteria. When the one time frame is a reserved time frame, the service excludes all ads for display when the transaction meets predetermined criteria. In one embodiment, the service reserves all of the time frames for ads from a predetermined set of one or more sponsors. The service may nonetheless determine an ad to display when the transaction meets predetermined criteria as the ad for display and preempt such a reserved time frame with the determined ad.

The service displays the ad in the one time frame or in a frame following the one time frame. Where the determined ad has a minimum duration, the service may display that ad for that minimum duration. Where the service has a minimum ad duration, the service may set a minimum ad duration for the ad. The minimum ad duration may be a natural-number multiple of that system-wide minimum ad duration. Displaying the ad then involves displaying the ad for that minimum ad duration.

The service may display the beginning of the ad but not its end. This may be due to an action of a consumer.

Alternatively, the service may set a minimum duration for the determined ad. The service then displays the ad longer than that minimum duration. This may be due to an action of a consumer.

The service may display the determined ad and another ad in the one time frame. The determined ad may have one sponsor and the other ad a different sponsor.

A consumer may respond to the ad. The response may indicate consent or lack of consent to a proposition of the ad. The consumer may so indicate by activating an input device at the POS location.

The service may record a representation of the response and may communicate that representation to a computer system for collecting responses.

The service may repeat the determination and display of an ad.

In one embodiment, the service advances from the one time frame into another time frame and repeats the determination and display with the other time frame. The service may advance on the activation of an input device at the POS location, on command from a POS system at the POS location, on recognizing that activity that the one frame spans has ended or on recognizing that a timeout has occurred.

The service may repeat the determination and display of an ad with successive time frames until the transaction completes or until a following transaction begins.

The service may repeat the division, determination and display with a subsequent transaction.

Where the displayed ad was an ad for display when the transaction met predetermined criteria, the service may disqualify that ad from displaying again in the transaction. Where the displayed ad was an ad that is for display without regard to the specifics of the transaction and that originated in an ad-management service, the service may disqualify that ad from displaying again in the transaction.

The service may communicate an ad that is for display without regard to whether a transaction meets predetermined criteria—particularly before dividing the transaction. The service may communicate the ad at a predetermined interval.

The service may communicate a first ad that is for display without regard to whether a transaction meets predetermined criteria and then engage in a consumer transaction. During the transaction, the service may communicate a second ad that is for display when the transaction meets predetermined criteria. The communication of the first ad may involve communicating—at a predetermined interval and during the transaction—ads that are for display without regard to whether a transaction meets predetermined criteria.

The service may displaying the first ad, the second ad or both during the transaction.

The service may determine advertisements for presentation to multiple consumers at respective POS locations by substantially simultaneously receiving two requests for ads that are for display when a transaction meets predetermined criteria. Each request transmits respective information about the consumer transactions occurring at the respective POS locations. In this embodiment, the service determines from the transmitted information that the two transactions are similar enough that one ad will satisfy both requests. The service responds to both requests with the same response that indicates a determined ad for display. (The service may transmit a request for the one ad to multiple ad-management services.)

In one embodiment, the invention is a computer-readable, data-storage medium containing a computer program for causing a POS system to display ads by dividing a consumer transaction at a POS location into multiple time frames, determining an ad for display in one of the time frames and displaying the ad in one of the time frames. One of the time frames may span one of the following transaction activities: waiting for a consumer to begin a transaction, greeting a consumer, beginning a transaction, selecting a form of payment, swiping a card for a form of payment, entering a security code for the form of payment, identifying a product for purchase, displaying a total cost for products identified for purchase, signing for a transaction and thanking a consumer his purchase.

In one embodiment, the invention is a POS system displaying ads that includes the above computer-readable medium, a CPU for executing the program in the medium, a bus communicatively coupling the medium and the CPU, and a display, responsive to commands from the CPU.

In one embodiment, the invention is a computer-readable, data-storage medium containing a computer program for causing an advertising-management-service computer system to determine advertisements for presentation to multiple consumers at respective POS locations by substantially simultaneously receiving two requests for ads that are for display when a transaction meets predetermined criteria (each request transmitting respective information about respective consumer transactions occurring at respective POS locations), determining from the transmitted information that the two transactions are similar enough that one ad will satisfy both requests and responding to both requests with the same response that indicates a determined ad for display.

In one embodiment, the invention is an advertising-management service including the above computer-readable data-storage medium, a CPU for executing the program in the medium and a bus, communicatively coupling the medium and the CPU.

In one embodiment, the invention is a consumer-transaction system that includes two instances of the above POS system, the above advertising-management service, and two links respectively and communicatively coupling the two POS systems to the advertising-management service.

BRIEF DESCRIPTION OF THE DRAWINGS

FIG. 4 illustrates a sequence FS of frames of a transaction during which a sponsor is running a run-of-site campaign.

DESCRIPTION OF SPECIFIC EMBODIMENTS

TABLE OF CONTENTS

| | |
|---|---|
| Overview | 11 |
| Data Structures | 15 |
|     Advertisements | 15 |
|     Frames | 19 |
|     Packages | 26 |
|     Requests | 26 |
|     Responses | 26 |
|     Campaigns | 27 |
| Protocols | 28 |
|     An Advertising Service | 28 |
|     Busy-Time Logic | 32 |
|     Campaign Scheduling | 33 |
|     Campaign Accounting | 35 |
|     Request Management | 36 |
| Expanded Illustration | 37 |
| WHAT IS CLAIMED IS | 40 |

Overview

Figure 1:
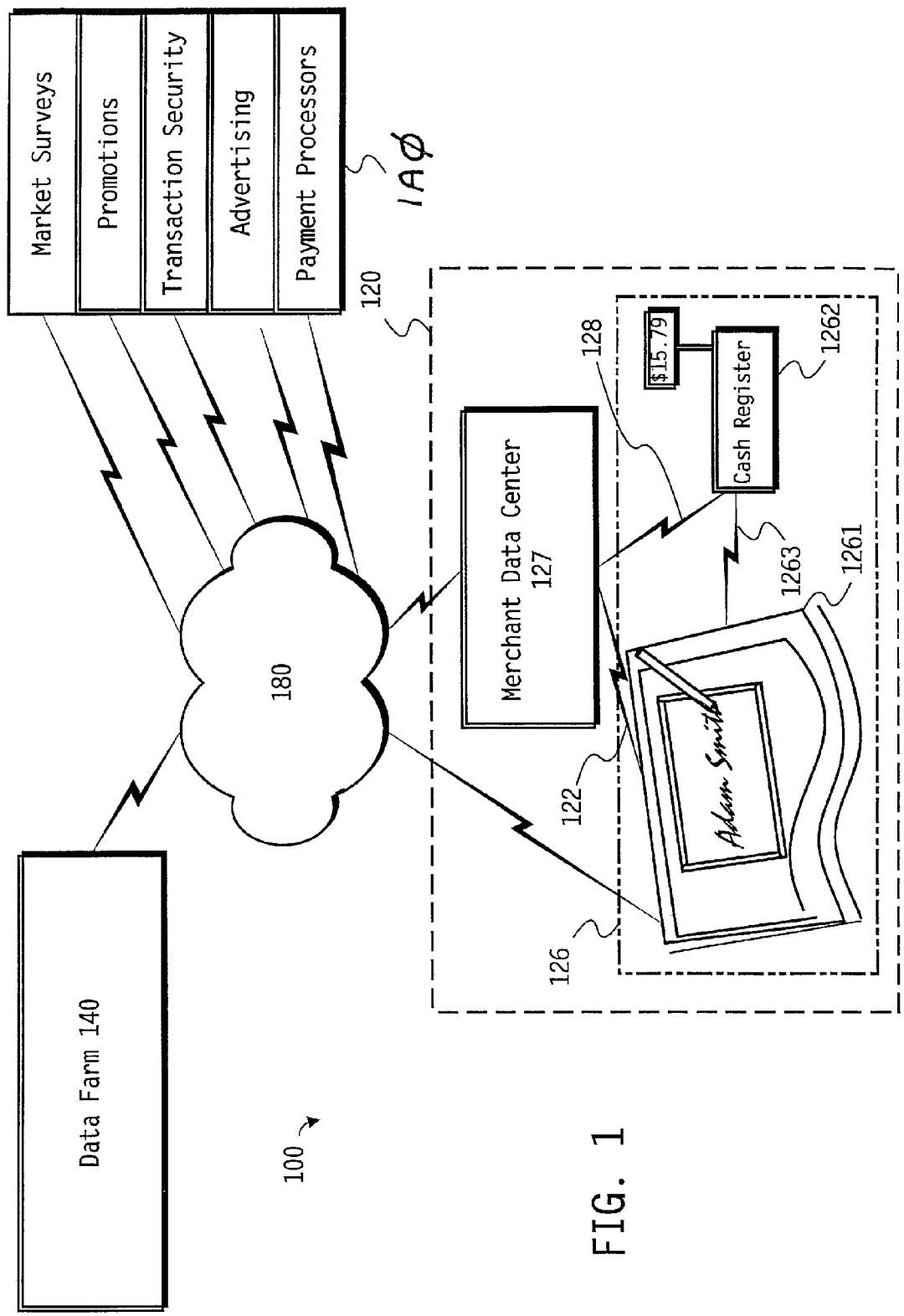
FIG. 1 illustrates an electronic transaction system 100 incorporating one embodiment of the invention.

FIG. 1 illustrates a transaction system 100 incorporating one embodiment of the invention. The system 100 includes a central data center 140, one or more clients 120 and application service providers (ASPs) 1A0. The system 100 also includes the communications link 180. The link 180 communicatively couples the data center 140, the clients 120 and the ASPs 1A0.

While a client 120 may be other than a merchant, the preferred embodiment is a merchant client 120. Accordingly, the following description assumes a merchant client 120.

Each client 120 communicates with the data center 140 using the communications link 180. The link 180 is preferably asynchronous, allowing the client 120 to perform operations independent of pending communications with the data center 140. Where the communications link 180 is an internet, the clients 120 and the data center 140 are each communicatively connected as hosts on the internet 180. (The actual status of a component of the system 100 as a host on an internet 180 may depend on the directness of the connect-ion of that component to the internet 180 by a service provider, if any).

Multiple data centers 140 may cooperate. In such cases, the multiple data centers 140 are considered a distributed form of one data center 140.

A merchant client 120 may include a merchant data center 127 and one or more point-of-sale/service (POS) systems 126. A POS system 126 and the merchant data center 127 may communicate over a communications link 128 (typically a serial link) or a communications link 122.

In addition to communicating using the link(s) 128, 122, the POS system 126 may communicate by means of the link 180, as a host on the internet 180, for example. In this scenario, the POS system 126 is formally the client of the data center 140.

The POS system 126 may include a cash register or like portion 1262 that is typically not web-enabled. A web-enabled portion 1261 is herein termed the "transaction computer." A communications link 1263 may communicatively couple the transaction computer 1261 and cash register 1262.

The web-enabled transaction computer 1261 may connect the POS system 126 to the data center 140 by means of the communications link 180. In this scenario, the transaction computer 1261 is formally the client of the data center 140.

Alternatively, the merchant data center 127 or the cash register 1262 may be the client of the data center 140. Indeed, the transaction computer 1261, the cash register 1262, the POS system 126 and the data center 127 in some combination may be the client of the data center 140.

If present between the data farm 140 and the transaction computer 1261, the merchant data center 127 (or a transaction hub, not shown) may perform some of the advertisement-selection logic, advertisement serving or advertisement caching described herein. The merchant data center 127 may not be owned by the merchant 120.

The transaction system 100 may integrate the typically non-web-enabled ("cash-register") and web-enabled portions 1262, 1261 of the POS payment platform, may maintain them distinct from but directly connected to each other or may only associate them (i.e., may only indirectly connect the cash-register and interactive web-enabled portion 1262, 1261 of the payment platform). Alternatively, a transaction system 100 may omit the cash-register portion 1262 of the POS platform altogether, as would typically be the case with small merchants 120.

An alternative embodiment of the POS system 126 is as a web server where consumers can purchase products.

Figure 2:
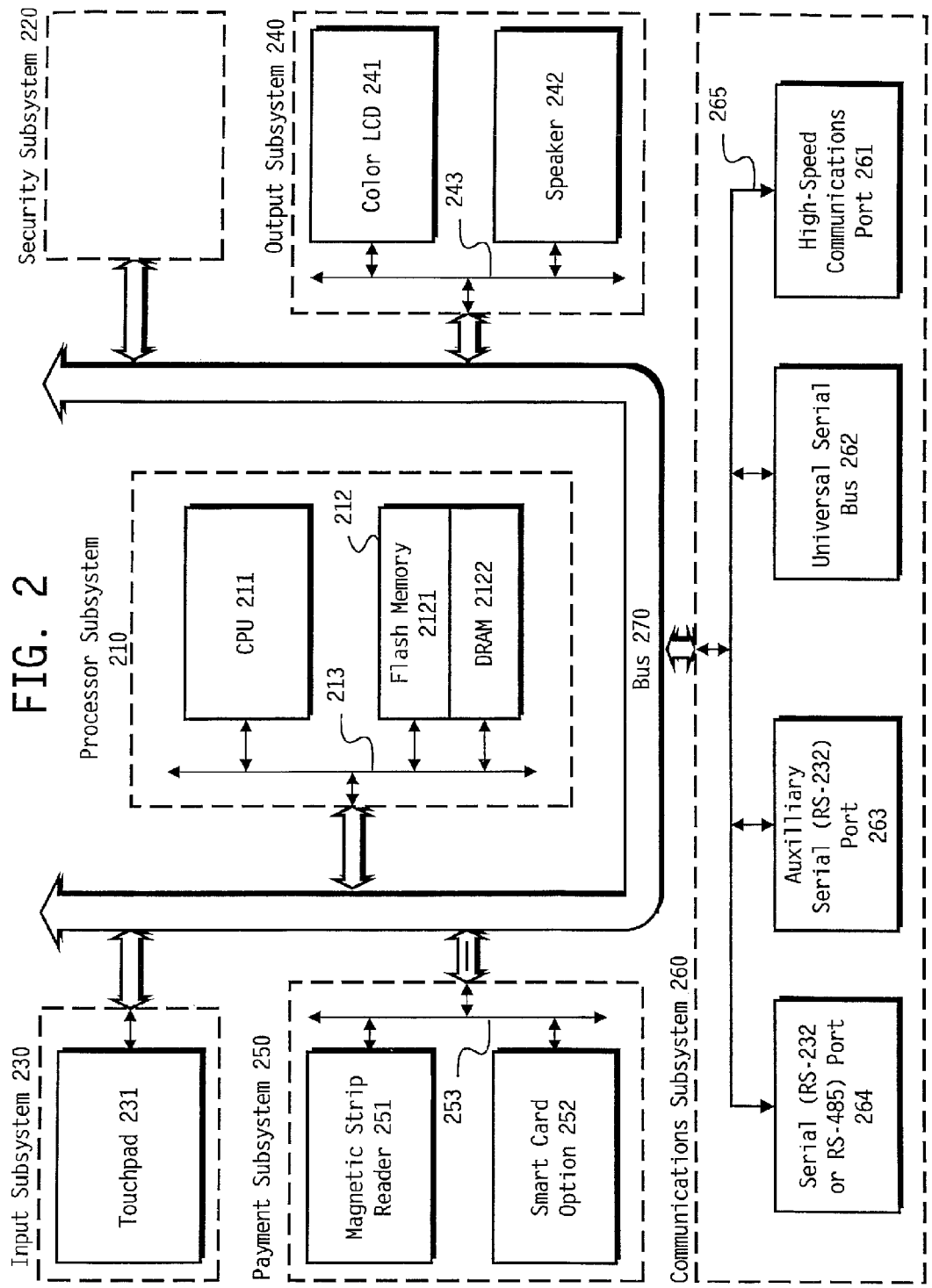
FIG. 2 illustrates of the transaction computer of the POS system of FIG. 1, according to one embodiment of the invention.

FIG. 2 illustrates a transaction computer 1261 of a POS system 126 according to one embodiment of the invention. The transaction computer 1261 may include a CPU 211, a memory 212, a display 241, a touch pad 231 and a card, biometrics or bar-code reader. The display 241 and touch pad 231 may combine to create a virtual PIN pad for numeric entry or virtual paper for electronic signature capture, as are known in the art. A more complete description of the transaction computer 200 can be found in U.S. patent application Ser. No. 09/480,883, entitled, "An Electronic-Receipts Service," filed Jan. 10, 2000, naming Scott T. Allan et al. as joint inventors, and assigned to ReceiptCity.com, San Jose, Calif. Accordingly, U.S. patent application Ser. No. 09/480,883 is incorporated by reference herein.

An example transaction illustrates the system 100 in situ: A customer of a merchant 120 approaches the merchant 120's POS location having the POS system 126. The customer wishes to purchase a selection of the merchant 120's goods.

The customer presents to the merchant 120's sales agent the selected goods. The sales agent identifies each of the selected items—for example, by scanning each past a barcode scanner in the POS system 126. Say, the customer is buying a personal portable MP3 player, inter alia.

The currently popular scannable mark for items for subsequent purchase is the Uniform Product Code (UPC). UPCs are well known in the art and are, therefore, not described herein.

With each item identified, the client POS system 126 and the data center 140 communicate. The result of the communications is that the transaction-computer client 1261 presents the customer with an advertisement that the data center 140 determines is appropriate for the customer buying the identified items. Because the customer is expected to be at the POS system 126 up to 90 seconds, the data center 140 instructs the client (here, the POS system 126) to display a multiplicity of distinct contents. For example, the customer may see an instantly redeemable coupon for the portable player that he is currently purchasing. He may see a coupon for the type of batteries that power the portable player he is purchasing. He may see a survey from the merchant 120 regarding service at the merchant 120's store (or web site) or from a manufacturer 130 regarding consumer electronics. He may see an interactive advertisement.

Each transmitted content encourages the customer to attend to its proposition and, as appropriate, to indicate consent. For example, an instantly-redeemable-coupon content may encourage the customer to select the coupon by touching an area of the screen of the POS system 126 or clicking on an area of a web page.

Any response to a content may be communicated to the data center 140. The center 140 may alter the current or subsequent presentation of content to conform with the response it received. Additionally or alternatively, the interactive portion 1261 may be so responsive. (The lack of a response, which is of itself useful information, may or may not be explicitly communicated to the data center 140.)

At some point in the transaction, the customer identifies himself. In one embodiment, this identification occurs relatively late in the transaction, say, after the sales agent has identified all of the items that the customer selected and the POS system 126 has displayed the transaction summary, including a total. In another, preferred embodiment, the identification occurs relatively early in the transaction, thus helping the transaction system 100 target the contents for display to the identified customer. Identification may occur in the form of payment (that is to say, by means of a credit card, debit card, smart card or check) or in the form of a loyalty, driver's license or other identification card. Of course, the customer may manually identify himself or be identified based on one or more of his biological characteristics.

Data Structures

Advertisements

A first data structure is an advertisement. Advertisements may be in the Graphical Interchange Format (GIF), well known in the art of images and compression. A GIF file is limited to 256 colors and may be animated or non-animated.

In an alternate embodiment, an advertisement may be in a markup language—XML, the eXtensible Markup Language, is an example. In a mark-up language, advertisements or interactive advertising images may be encapsulated or packaged. For example, where a consumer clicks on an advertisement on display, a second advertisement in the package displays.

In yet another embodiment, an advertisement may be in a rich-media format. Shockwave® and Java® are examples. (The former is available from Macromedia, Inc., San Francisco, Calif.; the latter from Sun Microsystems, Inc., Mountain View, Calif.)

In the preferred embodiment, advertisements may be in any of the GIF, markup-language or rich-media formats.

An advertisement has characteristics, which may include one or more of the following: identity, size, type, duration, interactivity, priority and an expiration date. Each of these characteristics is described in turn below.

The transaction system 100 may assign each advertisement a unique identifier. This facilitates caching advertisements and tracking advertisement responses.

Advertisements may be of multiple sizes—"standard" and "grand," for example. The first, standard, may consume approximately half of the available display area on an POS-system display 241. With a POS-system display resolution of ¼ VGA (320×240 pixels), for example, a standard advertisement could have a size of 315×98 pixels.

A grand advertisement consumes a larger portion of the screen 241 than the standard advertisement. In the embodiment of a 315×98-pixel standard advertisement, a grand advertisement could be 315×156 pixels, for example.

Advertisements may be of two types: specific and filler (with local advertisements a special form of filler advertisements). The data center serves up specific advertisements for display when the transaction at hand meets key criteria.

Filler advertisements display when specific advertisements are not available. A specific advertisement may be unavailable for any number of reasons: For example, the data center cannot find an advertisement that meets the specifics of the transaction because such an advertisement does not exist or because it does not have enough time to complete the search. Filler advertisements display without regard to the specifics of the transaction at hand.

A filler advertisement may be local. That is to say, a local advertisement may be a filler advertisement that originates with the merchant 120. The remainder, non-local filler advertisements originate outside the merchant—typically as here, with the data center 140 or its agents 1A0. Local advertisements reside on the client.

A client may have one local advertisement of each size. A merchant's logo may compose a local advertisement, as may a non-textual image that fits graphically into the advertisement space.

The transaction system 100 may associate a duration with each advertisement of the specific type. In one embodiment, the transaction system 100 has a system-wide minimum duration for an advertisement, and durations for a particular advertisement are natural-number multiples of that minimum duration. Example minimum durations are 3 and 5 seconds. An advertisement typically displays for its entire duration unless the progress of the transaction dictates a move to the next screen. (The data center 140 may collect the actual durations of advertisements.)

An advertisement may be of indeterminate length, as when the action of the consumer may shorten or lengthen the time an advertisement displays.

An advertisement may be interactive or non-interactive. Interactive advertisements encourage the customer to activate an input device associated with the client in response to the advertisement—to click a mouse or touch a touch screen, for example. Non-interactive advertisements do not solicit such an input from the customer.

The system 100 records the customer's response to an interactive advertisement. The response may be an action or failure to act. The data center 140 may collect customer interactions with advertisements.

In one embodiment, filler advertisements are always non-interactive.

Each advertisement may have a priority that controls the order in which the advertisements display. The advertisement with the highest priority displays first, the advertisement with the next highest order (if any) displays next, and so on. The system 100 may base priority on the characteristics of both the advertisement and the transaction. The ordered rules to determine priority according to one embodiment are as follows:

First, all specific advertisements display before all non-local, filler advertisements which, in turn, display before any local filler advertisements.

Second, an advertisement with a given duration displays before any advertisement with a shorter duration.

Third, interactive advertisements display before non-interactive advertisements.

Fourth, advertisements relating to the identity or category of an item display before advertisements relating to the client's physical location.

Fifth, advertisements relating to the client's physical location display before advertisements relating to the time of a transaction.

Sixth, advertisements relating to the time of a transaction display before advertisements relating to the price of an item.

Seventh, given two advertisements with equal priority, the advertisement that has been selected least often gets an increase in priority.

Eighth, given two advertisements with equal priority, a random one of the two gets an increase in priority.

A weighted score according to the above rules may be assigned to each advertisement, and the weighted score may then determine the next advertisement to display. Each advertisement may have an associated override flag. When such an override flag is set, the associated advertisement moves to the head of the selection queue. That is to say, its priority increases arbitrarily but sufficiently to give it highest priority. (In one embodiment, only one such override flag may be asserted in a given transaction.)

In one embodiment, once a specific or non-local, filler advertisement displays in a transaction, it may not repeat. Local advertisements may display more than once in a given transaction.

An advertisement may have a start date, that is, a date on and after which the system 100 may display the advertisement. A corresponding end date for an advertisement is optional.

An expiration date is the date after which the product advertised in the advertisement is no longer available or no longer available on the advertised terms. The expiration date is typically the same as the end date for an advertisement. However, an expiration date may occur after the corresponding end date. For purposes such as consumer-demand testing, an expiration date may even occur before the corresponding end date for the advertisement.

Using a website, store administrators and advertising-service management with appropriate access privileges may change, delete or add advertisements on the data center 140 or ASP 1A0. Modifications to advertisements via this website may take effect in real-time.

Reports of advertisement usage for advertisements may be accessible from a website. The report may display counts based on a given time period. The number of times an advertisement was served, the number of times an advertisement displayed for its entire duration, the number of times an advertisement displayed for a portion of its duration, and the number of seconds an advertisement displayed are examples. Reports may be available in near real-time.

Frames

Figure 3:
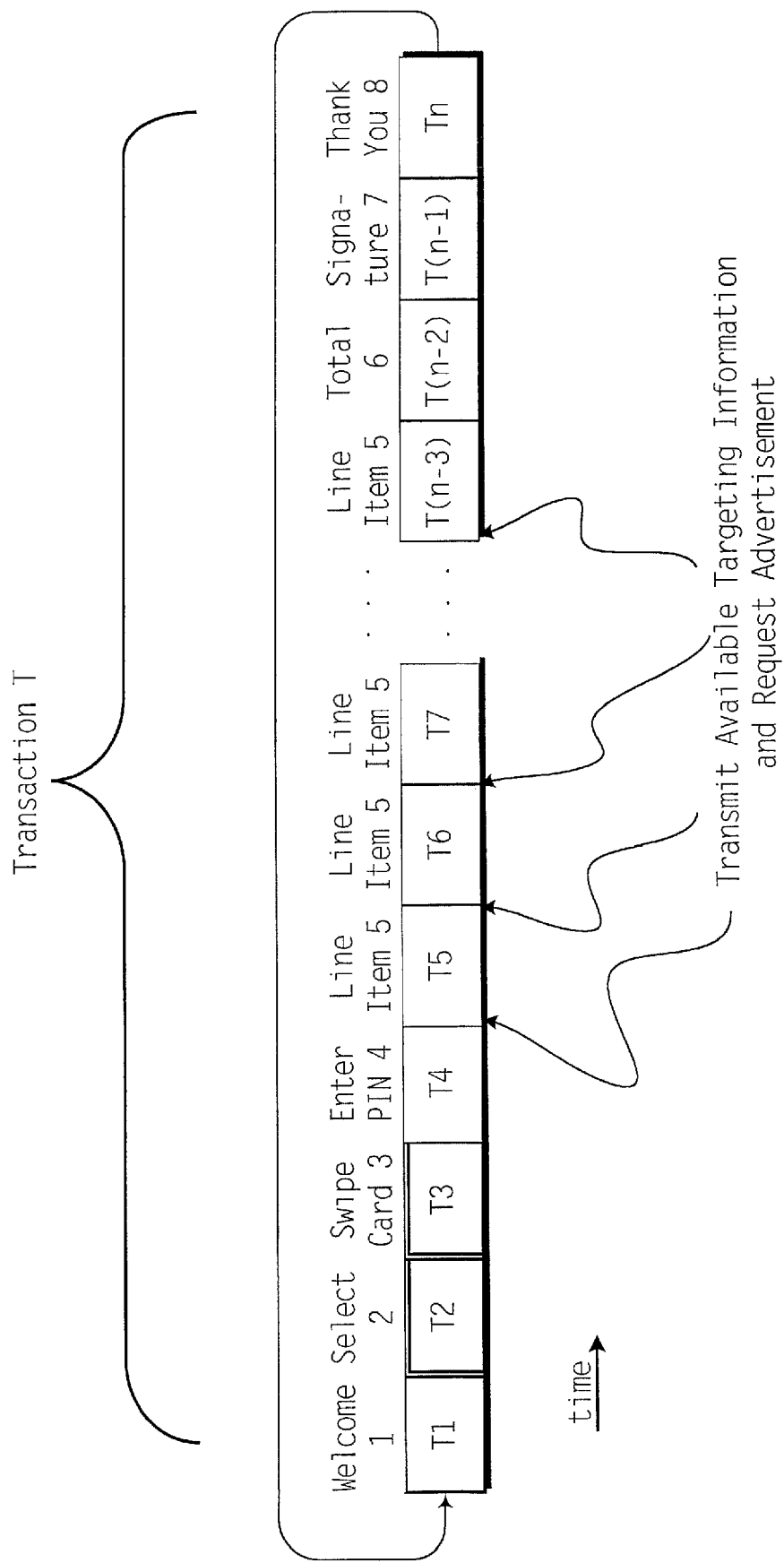
FIG. 3 illustrates the division of a transaction T into n frames.

A next data structure is a frame. Each transaction is divided with respect to time into a sequence of "frames," A frame is thus a division of a transaction. FIG. 3 illustrates possible divisions of a transaction T into n frames, labeled T1, T2, . . . T(n−1), Tn. FIG. 3 illustrates eight (8) types of frames: Welcome (frame type 1), Select Form of Payment (frame type 2), Swipe Card (frame type 3), Enter PIN (frame type 4), Line Item (frame type 5), Total (frame type 6), Signature (frame type 7) and Thank You (frame type 8). Other types of frames are possible: Survey, Promotion, Apply for Store Card, Information, Customer Sign-in and Interactive are examples.

A transaction may have zero, one or multiple instances of each type of frame, in an order as varied as is logical, necessary or desirable. For example, while logic would seem to require a Signature frame to always follow a Select Form of Payment frame, situations are conceivable where this is not necessarily so. Where a merchant's ability to recognize signatures is good enough to identify a customer from a signature match, the merchant may place a Signature frame before a Select Form of Payment frame—even where the selected form of payment does not require a signature. As another example, empirically, every automated-teller machine (ATM) asks first for a swiping of the bank card and then an entering of a PIN. However, asking for the PIN first and then the card is not unreasonable. Because of scenarios such as these, the advertising service described herein does not limit the order of frames in a transaction.

Entry into and exit from each of these frames is described in turn below: The Welcome type-1 frame typically begins a transaction: The Welcome type-1 frame may be the default frame that a customer sees on approaching a client 120, 126, 1261. For the time the transaction T is in the type-1 Welcome frame, the display 241 of the POS-system client 126 may display the logo of the merchant 120 in which the POS is located. If an advertisement has been arranged for the Welcome frame (as described herein), the POS-system client 126 may display that advertisement or may toggle its display 241 between that advertisement and the merchant logo. Where multiple advertisements have been arranged for the Welcome frame, the POS-system client 126 may cycle its display 241 between those multiple advertisements, including or excluding the merchant logo. (The POS-system client 126 does not necessarily divide the time of display evenly among each of the advertisements and the logo, although in one embodiment it does.)

Where no specific advertisement has been arranged for this frame, the client displays a filler advertisement in a type-1 frame. The filler advertisement may be a default advertisement previously received from the data center 140, a recently received filler advertisement from the data center or a local advertisement.

The POS system 126 may exit from the Welcome frame and advance into the next frame if the customer activates a POS-system input device, indicating that he is attending to the display 122. The system 126 may also exit and advance with POS-system activity that indicates that a transaction has begun.

If a customer clicks on an advertisement, the system 100 may record that response and (a reference to) the corresponding advertisement. The system 100 may also charge the sponsor of the (original) advertisement for the click tracking or for an advertisement that displays in a subsequent frame and that may not have displayed had the customer not clicked on the original advertisement. Such fee assessment may apply successively as the customer clicks his way through a series of advertisements from the sponsor.

(While an expected method of indicating interest may be clicking on a portion of the display 241 with a mouse, a routine practitioner of the art will understand that a customer may indicate interest in any number of alternate ways well known in the art: touching the screen or hitting a key on a keyboard, for example.)

The type-2 Select Payment frame may present all payment options in one frame for a customer to chose the correct one. In an alternative embodiment, the Select Payment frame is actually a series of frames $2a, 2b, \ldots, 2i$, where $1<=i<=m$ and m is the number of distinct payment methods possible. By spreading the selection of a payment method across multiple frames $2i$, the system 100 can associate an advertisement with each frame $2i$ and thereby increase the number of advertisement frames available and the advertising revenue derivable.

The system 126 may present the payment options in one frame-enabled-browser frame while presenting any advertisement in another frame-enabled-browser frame. (The word "frame" has two distinct meanings in this application. In one sense, it refers to a time- or activity-wise division of a consumer transaction as described herein. In a second sense, it refers to the divisions of a markup-language page into distinct areas, as is well known in the art of internet browsers, particularly frame-enabled ones. Therefore, to clarify intents and to avoid confusion, when referring to the latter, this application intends to always use the phrase "frame-enabled-browser frame" or "FEB frame." When referring to the former, this application intends to always use simply the word "frame.")

The client may exit from the type-2 Select Payment frame(s) and advance into the next frame when the customer selects a form of payment. As such, the type-2 Select Payment frame may not have a fixed duration, and any advertisement displayed or to be displayed in the frame may abort or end with payment selection and frame advancement.

In the type-3 Swipe Card frame, the client may present an image to the customer that directs or otherwise indicates to the customer to swipe the card of preference at this time. This card-swipe image may be pure text, a picture or a combination of the two. The client may exit from the type-3 Swipe Card frame and advance into the next frame when the customer successfully swipes a card corresponding to the payment method selected. Like the type-2 Select Payment frame, the type-3 Swipe Card frame may not have a fixed duration, and any advertisement displayed or to be displayed in the frame may abort or end with the card swipe and frame advancement. In one embodiment, the system 126 presents the card-swipe image in one FEB frame while presenting any advertisement in another FEB frame.

In a type-4 frame, the Enter PIN frame, the client may present an image to the customer that directs or otherwise indicates to the customer to enter his personal identification number for the card used in the preceding type-3 Swipe Card frame. Like the type-2 Select Payment frame, the type-4 Enter PIN frame may not have a fixed duration. Any advertisement displayed or to be displayed in the frame may abort or end with the customer's successfully entering a valid PIN and subsequent frame advancement.

In a type-5 Line Item frame, the client may display a receipt line item for an item identified for purchase (typically, a scanned item). Successive type-5 Line Item frames may generate a scrolling-receipt effect.

The client may exit from a type-5 Line Item frame and advance into the next frame when the advertisement for the frame runs its course. As such, a type-5 Line Item frame with scheduled advertisement may have a minimum duration—the system-wide minimum duration of an advertisement, for example. Frame advancement may occur on a timer or on command from the POS system 126.

The client may advance into a type-6 total frame on input from the POS system 126 operator (the cashier), indicating that all items for purchase have been identified. In the preferred embodiment, the transaction system 100 does not display advertisements during the type-6 Total and type-7 Signature frames. The client may advance on a timer or a command from the POS system 126 from a type-6 Total frame to a type-7 Signature frame and advance from a type-7 Signature frame to a type-8 Thank You frame on a click, a time out or POS-system command.

With respect to advertisements, the transaction system 100 may treat a type-B Thank You frame much the same as a type-1 Welcome frame. If an advertisement has been arranged for this frame 8, the POS system 126 toggles its display 241 between that advertisement and the merchant logo. Where multiple advertisements have been arranged for this frame 8, the client may cycle its display 241 between those multiple advertisements and the merchant logo. (The system 126 does not necessarily divide the time of display evenly among each of the advertisements and the logo, although in one embodiment it does.)

The client 120 may exit from a Thank You frame 8 and advances into the next frame on a time out or when the client detects that a next transaction has begun. The advancement is typically a cycling into the type-1 Welcome frame.

In a Survey frame, a client may present a survey for the customer to complete. Frame advancement may occur when the customer completes the survey or otherwise indicates he is done with the survey. Frame advancement may occur on a timer or command from the POS system 126.

In a Promotion frame, a client may present information about an experience available to the customer (usually without cost to the customer). A personal appearance by a celebrity or author, a sponsored fireworks show, a sponsored commercial-free television program, a scheduled in-store product sampling and an AIDS benefit are examples of promotions. Frame advancement may occur on a timer or command from the POS system 126.

In an Apply for Store Card frame, a client may offer the customer a chance to apply for a store card now. The client, merchant or service may notify the sales agent of the customer's desire for an application, and the agent may supply an application at some point during or after the transaction. Where the POS system is sufficiently sophisticated, an electronic application may appear on the POS system for the customer to complete while at the system.

Frame advancement may occur when the customer indicates his (lack of) desire for an application. Frame advancement may occur on a timer or command from the POS system 126.

In an Information frame, a client may display information as predetermined by the merchant. Store hours, return policies, new-store openings, and parking-lot and parking-validation information are examples of the kind of information an Information frame may convey. Frame advancement may occur on a timer or command from the POS system 126.

In a Customer Sign-in frame, a client may prompt the user to identify himself. The process of identification may include entering an identifier, perhaps along with a security code. A customer ID and personal identifier (PIN), are examples. The identification process may include swiping a loyalty card. Indeed, the client may prompt the customer to position a specific part of his anatomy for a biometric scan.

Frame advancement may occur on successful identification of the customer or final determination that the customer cannot be identified. Frame advancement may occur on a timer, a failure count or command from the POS system 126.

In an Interactive Choice frame, the client presents the customer with a question and means for answering the question. Where the question is "Which Internet Service Provider do you want?", the answering means may be a list of choices. Where the question is "What is you telephone number?", the answering means may be a keypad of numbers.

Frame advancement may occur on the customer's answering the question or on finally determining that the customer appears unwilling or unable to answer the question. Frame advancement may occur on a timer, a failure count or command from the POS system 126.

The client may force the advancement from one frame to another at any time—irrespective of the state of the customer's interaction with the display 241, in particular, or the POS system 126, in general.

In one embodiment, frames in a transaction adjoin each other. That is to say, given two sequential frames in a transaction, the end of the first frame temporally coincides with the beginning of the second frame. In a second embodiment, two sequential frames may be separated by an interstice. One of ordinary skill in the art will appreciate that such an interstice may itself be considered an unnamed or unused frame. Thus, two sequential frames separated by an interstice may be considered three adjoining frames: the first frame, an interstitial frame and then the previously-considered-second frame.

Packages

A package is a representation of a survey, promotion or advertisement (collectively, "advertisement" herein). The data center 140 communicates packages to a client 120 on demand (request). ASPs 1A0 may communicate packages (or precursors to packages) to the data center 1A0 for possible re-packaging and subsequent presentation to the customer.

The portion of information in a package that a customer sees may depend on various triggers or responses that the customer supplies. In one embodiment, a package may be much like a website downloaded for offline browsing: More information is there than the surfer (customer) usually sees because of his interactive choices.

Requests

A request is a communication from a client 120 to the data center 140, asking for a package to display on the client's display 241. While a client 120 may by default allow the data center 140 to determine what type of advertisement to return (that is to say, conventional advertisement, survey, promotional text, general text, etc.), the client 120 may instead specify what type of advertisement the center 140 is to return.

Responses

A response is a representation of a customer's reaction to a packaged advertisement.

Campaigns

A rule associates transaction conditions (triggers) with ASP-directed data. If a transaction meets the conditions specified in a rule, then the data center 140 may forward the rule-associated data to an ASP.

In one embodiment, a rule has the following format:
if <condition>
add ASP Key #<number>[, weight=<number>]

The condition is a boolean expression based on predefined parameters, while the ASP Key numbers are predefined ASP key sequences. (The square brackets indicate optional material.) Thus, if the specified condition is met, the data center 140 adds the associated key data to a build for later prioritizing and communication to an ASP 1A0.

Two example rules are as follows:
if Consumer.Info!=NULL
add ASP Key #4
if SubTotal>200
AND Client.ID.ZipCode[0 . . . 1]="94"
add ASP Key #43
add ASP Key #30, Weight=0
add ASP Key #2, Weight=99
add ASP Key #53 where an example of the corresponding ASP Keys would be:
ASP Key #4
"Interest=" & Consumer.Info.Interests(5).Code
DefaultWeight=2

The first example rule is a test to determine whether information about the consumer is on record (that is to say, whether a data structure containing consumer information exists), and if so, to then add the ASP keys in ASP Key #4. ASP Key #4 directs the data center 140 to create a key-value pair consisting of the "Interest" key and the consumer interest code(s).

The second example rule specifies that if the running total of the transaction so far exceeds $200.00 (two hundred dollars), then the data center 140 is to add the keys specified in the ASP Keys #43, #30, #2 and #53. Weights of 0 and 99 are to be assigned to the ASP Keys #30 ad #2, respectively, overriding any default weights.

A rule may be required or random. The data center 140 processes a required rule for every build trigger it seeks to create. The nature of a random rule is that the data center 140 does not necessarily process that rule for every build trigger it seeks to create. For example, the center 140 may cycle through all of the random rules until it finds k whose conditions are satisfied. As another example, the center 140 may randomly select j rules from among all of the random rules. As still another example, the center may cycle through or randomly select rules until a predetermined time limit is reached.

Notably, in one embodiment, a client does not use rules at all. Such a client may depend on the logic of an ASP 1A0 or other outside campaign engine. A client may combine a rules-based approach with dependence on an outside campaign engine.

Protocols

An Advertising Service

The protocols enabling the invention are described more fully below.

Figure 5:
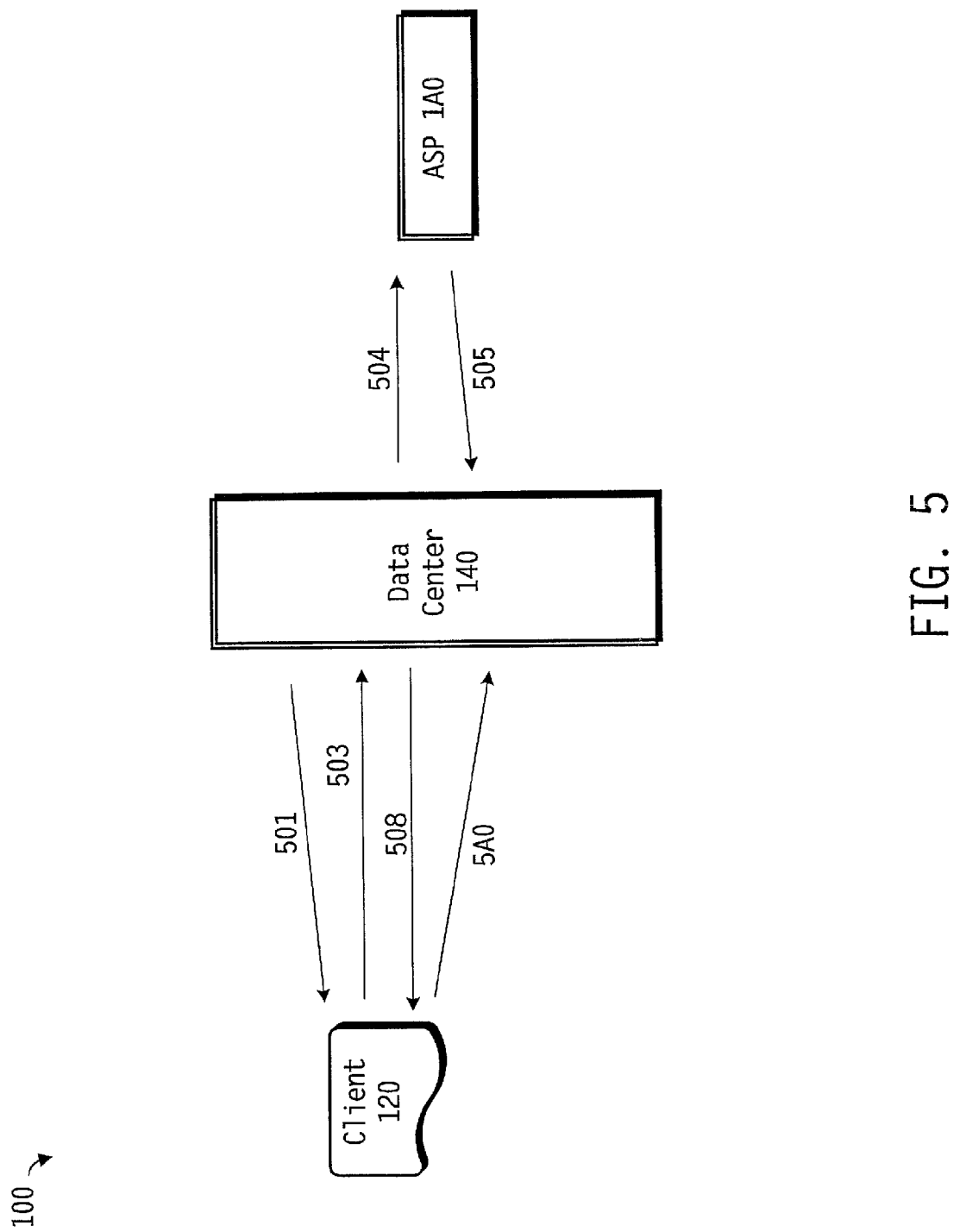
FIG. 5 illustrates the flow of data in the transaction system of FIG. 1.

FIG. 5 illustrates an exemplary flow of data in the transaction system 100 of FIG. 1. FIG. 5 shows the client 120/126/1261, data center 140 and ASPs 1A0 of the transaction system 100, with arrows representing communications between these components of the system 100 and the direction of communications between any two given components. Arrow 501 is a communication of filler advertisements from the data center 140 to the client 120. Arrow 503 represents a request from the client 120 to the data center 140. Arrows 504, 505 represent a communication from the data center 140 to an ASP 1A0, requesting a package and a responding communication from the ASP 1A0 to the data center 140, respectively. Arrow 508 represents a package from the data center 140 to the client 120, and arrow 5A0 represents the client's report to the data center 140 on package statistics and consumer responses.

This sequence of communications is described in more detail: The client 120 downloads filler (default) advertisements at predetermined time intervals (daily, for example) or predetermined times. The client 120 predicts entering (or actually enters) a frame in which advertising is permitted. The client 120 then builds a request containing triggers from the transaction and communicates that request to the data center 140.

A system 100 may use the following transaction information in triggers: the identity of the client 120, the location of the client 120 (for example, zip code, store, department within store); merchant type (mass, department, etc.); merchant identity; frame in the transaction (Welcome, Thank You, etc.); payment type; payment identity (for example, credit-card number); payment method (bank identification number, for example); consumer account number; driver's-license identification; line items (stock keeping unit (SKU) or universal product code (UPC)); product category; brand; item description; key words in the item description; the sub-total of the transaction; time, absolute or relative (the length of time in this transaction, the time of day, the date, the day of a week, the week within a month, the week within a year; relation to a holiday, as examples); and consumer profile (of consumers who register at merchants or service providers—ReceiptCity.com, for example—and express interest in special offers). This list is by way of example and not exhaustion, and the system 100 may use information singly or in any combination.

The data center 140 receives the request. The data center 140 may select additional information from sources other than the client 120 to help it target an advertisement for the consumer. It may seek additional information about the consumer from a database of consumer information, for example, or from a database of demographics of users of the client 120.

The data center 140 may maintain a database of rules. It may apply the information received from the client and any additional sources to these rules to create trigger builds. The data center 140 may then sort the trigger builds and select a percentage or absolute number that are the top.

The data center 140 may then send (these selected top trigger builds as) a request to the ASPs 1A0. This request may be directed communications to one or more ASPs 1A0. The request may be a broadcast to the ASPs 1A0.

An ASP 1A0 receives the build and returns an identifier for an advertisement to the data center 140. Of course, instead of transmitting only an advertisement identifier, the ASP 1A0 may transfer more of—or even the entirety of—the advertisement. This latter method is, however, less efficient.

The data center 140 uses the returned advertisement identifier to identify an advertisement in its database. Where the identifier is valid, the data center 140 may compare the returned identifier to the advertisements, brands and similar products already used in this transaction. Where the identified advertisement is acceptable, the data center 140 may cache the identifier and associated information.

The data center 140 may then give a priority to the identified advertisement. The center 140 packages it for transmission and communicates the package to the client 120.

The client 120 receives the package and unpacks the advertisement. The client may display the advertisement according to priorities.

A low end-to-end transfer time is desirable and is preferably about 4-5 seconds as a maximum. The end-to-end transfer time is the elapsed time from the request by the client 126 for an advertisement to the client 126's receiving an advertisement in response to that request. An end-to-end transfer time of about five (5) seconds is particularly useful in type-5 Line Item frames where human form factor considerations suggest displaying an advertisement targeted by the item identified for purchase at substantially the same time or shortly after that item was identified for purchase. (The item identification may be scanning, mouse clicking or some other action.)

Preferably, an advertisement appears to human form factors to render instantaneously. That is to say, it displays substantially instantaneously.

Where the data center 140 has directed the client 120 to cache the advertisement, the client 120 does so, The center 140 may send a targeting filter along with the advertisement to the client 120. In subsequent item identifications and transactions, the client 120 may itself apply the filter.

Alternatively, the center 140 and the client 120 may communicate a unique identifier associated with the advertisement. Then the center 140 subsequently sends the unique identifier rather than the advertisement package.

The client may return to the data center 140 information about which advertisements it displayed and what the consumer's responses were to the advertisements. This allows the data center 140 to analyze responses individually or as groups for billing and statistical purposes.

The data center 140 may maintain statistical information on a usage or summary basis. Usage-based information maintains a different record for each exposure of each advertisement, while summary-based information maintains a different record for each advertisement identifier. Thus, in a situation where a client displays a given advertisement four times over several transactions, usage-based information would maintain four separate records while summary-based information would maintain one record indicating four displays.

Preferably, between the instructions from the data center 140 and its self-direction, a client 120 never has an unfilled or "blank" frame. Towards this end, a client 120 may display one or more filler advertisements if a specific advertisement has not been requested, if a requested specific advertisement does not arrive within a predetermined time frame (the 4 to 5-second end-to-end transfer time, for example) or if a non-local filler advertisement does not arrive within a predetermined time frame.

In one embodiment, there is no advertisement "duplication." That is to say, the data center 140 does not provide and a client 120 does not display a given specific advertisement more than once in a given transaction.

For a given transaction frame available for advertisement, a client 120 may display an advertisement for that frame. Where a frame is reserved for filler advertisements, the system 126 may retrieve and display a filler advertisement. Where the frame is not reserved for filler advertisement, the system 126 may request a specific advertisement of the data center 140.

Where no non-local, filler advertisement and no specific advertisement are available, the client 120 may display a local advertisement.

Busy-Time Logic

Any of the system 100, the merchant 120, the POS system 126, the transaction computer 1261 and the cash register 1262 may be intelligent enough to recognize a period of time when the POS system 126 is busier than other periods of time. The system 100 may then adjust the display of advertisements to prevent the display from slowing down transactions at the POS location and causing customers to wait unacceptably long.

For example, the system 100 or one of its components may determine busyness from a characteristic metric of the POS system 126 crossing a predetermined threshold. The number of transactions per time period, for example, may cross a predetermined threshold. The predetermined threshold may be adjustable.

On recognizing a busy time, the system 100 may adjust characteristics of an advertisement—reducing its duration, for example. The system 100 may adjust characteristics of some or all of the advertisements—selecting only non-interactive advertisements or selecting advertisements with a sufficiently short duration, for example. The system may substitute one type of frame for another. The system 100 may skip one or more frames altogether in a transaction. The system 100 may elect not to show advertisements at all.

Campaign Scheduling

Within a given advertising campaign, the system 100 may identify in advance advertisements from sponsors that compete with the merchant 120 or fail to meet the criteria of the merchant 120. (A tobacco producer, for example, will seldom meet the criteria of a fine department store.) The system 100 may then defer to human intervention to exclude the unacceptable sponsor or at least one of the competing advertisements.

A sponsor may reserve a run-of-site campaign wherein every frame available for advertisement displays one or more advertisements from that sponsor. A run-of-site campaign may apply to multiple transactions at a given client 120, 126, 1261, or such a campaign may apply to one transaction at each of a group of clients 120, 126, 1261. Tn its most intense form, a run-of-site campaign applies to all frames in all transactions at each of a group of clients 120, 126, 1261 for a period of time.

In one embodiment, the client 120 nonetheless continues to transmit targeting information to the data center 140 and to request specific advertisements so that targeted advertisements may preempt the sponsor's advertisements that would otherwise run in that frame.

FIG. 4 illustrates a sequence FS of frames 401-406 of a transaction during which a sponsor is running a run-of-site campaign. Each advertisement for each frame 401-406 in the sequence FS is from the sponsor, say, Piaget. In the alternative embodiment mentioned above, targeted advertisements may preempt the sponsor's run-of-site advertisements. Thus, the modified sequence FS' in FIG. 4 shows advertisements for different sponsors (GEtv, McDonald's and Supercuts) preempting Piaget advertisements in the frames 401', 403' and 404', respectively.

A run-of-site campaign may rotate the initial run-of-site advertisement among multiple preselected initial advertisements. Which succeeding advertisements the client 120 then displays may depend on the initial advertisement and the customer's reaction to it. Where a targeted advertisement preempts an initial run-of-site advertisement, that preempted initial run-of-site advertisement retains its first-up-for-rotation status, according to one embodiment.

The system 100 may recognize multiple merchants 120 as a "merchant chain." The system 100 may simultaneously apply an advertising campaign to each merchant 120 in such a merchant chain as it would to a single merchant 120.

The system 100 may display an advertisement with an expiration date in the future with a graphic meter that indicates the time remaining before the expiration of the advertised offer. A countdown timer of "0 days, 12 hours, 14 minutes" is an example of such an expiration-date meter for time-sensitive offers.

The system 100 may display multiple advertisements in a single frame with the advertisements originating from different sponsors. For example, in the Welcome frame, a client 120 may show a merchant 120 advertisement, then an American Express$^{SM}$ advertisement and then an NBC (National Broadcasting Company, Inc.) television advertisement.

Campaign Accounting

The data center 140 may track advertisement activity. For example, the center 140 may track any of the following, singly or in any combination:

the number of impressions per unique advertisement per time period the percentage of impressions that are unique per time period the number of advertisements retrieved from a campaign manager (Adforce, Inc., Cupertino, Calif., for example) but not displayed ("advertisement inactivity")

of all advertisements retrieved from a campaign manager, the percentage not displayed the number of advertisements requested from a campaign manager but not received of all advertisements requested from a campaign manager, the percentage not received the number of views that were less than full impressions ("partial activity")

of all impressions, the percentage that were less than full user activity during the display of an impression (click and click location "hot spots") including the number of clicks per interactive advertisement number of clicks per interactive advertisement, on a per-frame basis number of clicks per interactive advertisement, on a per-time period basis (for example, daily, weekly, monthly)

number of clicks per frame number of clicks per fixed "response" of an interactive advertisement user interaction percentages, including number of interactive advertisements which were clicked on versus total number of interactive advertisements displayed, globally or on a per-frame basis number of frames which were clicked on versus the total number of frames in which interactive advertisements were displayed, globally or on a per-advertisement basis the total time within a transaction that any advertisement was on display the total time of advertisement display following any given payment-option selection frame advancement, including causes for frame advancement, globally or a per-frame basis Such information may originate in the client 120, data center 140 or elsewhere—an ASP 1A0, for example. The destination of such information may be the client 120, data center 140 or other entity such as an outside agency or ASP 1A0.

Request Management

The data center 140 may exercise discretion in forwarding a request from a client 120 to the ASPs 1A0. Particularly, when multiple clients 120 send requests to the data center 140 at substantially the same time, the data center 140 may compare the requests for similarity. Where two or more of the requests are sufficiently similar by some predetermined standard, the data center 140 may create only one build trigger, the response to which the data center 140 uses to respond to clients who communicated similar requests. More generally, where n (n>=2) requests are sufficiently similar by some predetermined standard, the data center 140 may create i (1<=i<=n) build triggers to communicate to one or more ASPs 1A0. The responses, if any, to the i build triggers the center 140 uses to respond to the clients who communicated the n requests.

One advantage of sending build triggers out to more than one ASP 1A0 is that should one ASP 1A0 fail to respond, multiple transactions are not left without advertisements.

The data center 140 may cache client requests and ASP responses to those requests while maintaining the relationships between the two. Thus, when the data center 140 later receives a client request, it can compare the most recent request to the cached requests to determine whether it has seen a similar request before and already has an answer to such a request. This comparison to cached requests permits the data center 140 to avoid (the delay and other expenses of) communicating with an ASP 1A0 in response to the new client request.

Expanded Illustration

With the descriptions of devices and protocols given herein, a more detailed version of the example walk-through follows: A customer of a merchant 120 approaches the merchant 120's POS location having the POS-system client 126. The customer wishes to purchase a selection of the merchant 120's goods.

The customer approaches the POS-system client 126. The client 126 is in a Welcome frame waiting to begin a transaction. The display 241 greets the customer with the merchant 120's logo. The client 126 awaits input from the customer or the sales agent, indicating that the transaction has advanced to the selection of payment. Assume that the customer provides no input.

The customer presents the selected goods to the merchant 120's sales agent. The agent then indicates to the client 120 that a transaction has begun and that he will imminently identify items for purchase.

In response, the client 126 advances from the Welcome frame to the Select Payment frame and presents payment options in one FEB frame on its display 241. The client 126 also displays a local advertisement of the merchant 120's for discounts for using the merchant's store credit card. The customer selects a VISA$^{SM}$ credit card as his choice of payment. The client 126 then moves from the Select Payment frame to the Swipe Card frame.

The client 126 is now in a frame where no specific advertisement has yet been requested (let alone is available). In this situation, the client 126 displays a filler advertisement previously or recently downloaded from the data center 140 or a local, filler advertisement.

Meanwhile, the agent has begun to scan the customer's selected items. During the scanning of the first item, the customer has not yet identified himself (by swiping a credit card, in this example). The client 126 nonetheless collects certain transaction information to form a request for an advertisement.

As before, the customer is buying a portable MP3 players. Let's say the client transfers its location (including department), the frame in the transaction, the payment type, the SKU or UPC for the portable MP3 player, key words in the item description and time of day and date to the data center 140.

The customer succeeds in swiping his card, making his consumer account number available to the client 126. The client 126 correspondingly advances from the Swipe Card frame to the Line Item frame. On entering this frame, the client 126 generates another request for an advertisement. Let's say the client 126 displays a local advertisement in the meanwhile.

The center 140 has now received two requests from the client 120 for advertisements. For each request, the center 140 goes through the required rules, applying the information received from the client 120 to the conditions of the rules. For fulfilled conditions, it builds triggers. The data center 140 sorts the builds and by a predetermined method selects none, some or all of them for use. The center 140 next communicates any selected builds to one or more ASPs 1A0, any, all or none of which may respond with an advertisement.

Having received a response from an ASP 1A0, the center 140 formats the response into the package expected by the client 126 and forwards the package to the client 126.

The client 126 unpacks the package and displays the contained advertisement on its display 241.

Indeed, the invention now being fully described, many changes and modifications that can be made thereto without departing from the spirit or scope of the appended claims will be apparent to one of ordinary skill in the art.

This specification incorporates by reference all publications and patent applications mentioned herein, to the same extent if the specification had specifically and individually incorporated by reference each such individual publication or patent application.

What is claimed is:

1. A method for displaying advertisements ("ads") to a consumer through a display device of a transaction computer at a point-of-sale (POS) location, the method comprising:
    dividing a consumer transaction at a POS location into multiple transaction time frames;
    determining an advertisement (ad) for display in each of the transaction time frames; and
    displaying the ad in each of the transaction time frames on the display device of the transaction computer at the point-of-sale location, wherein the step of determining an ad for display includes:
    transmitting the consumer transaction to a data center:
    prioritizing automatically multiple ads competing for display in each of the transaction time frames based on characteristics of the ad, and the consumer transaction, and additional information associated with the user other than the consumer transaction,
    producing automatically an ad with highest priority in each of the transaction time frames,
    determining automatically, in each of the transaction time frames, the ad with highest priority as the ad for display, and
    transmitting the determined ad with the highest priority from the data center to the display device of the transaction computer for display.

2. The method of claim 1, wherein the step of prioritizing multiple competing ads comprises:
    setting the priority of an ad having a duration of n time units higher than the priority of an ad having a duration of less than n time units.

3. The method of claim 1, wherein the step of prioritizing multiple competing ads comprises:
    setting the priority of an interactive ad higher than the priority of a non-interactive ad.

4. The method of claim 1, wherein the step of prioritizing multiple competing ads comprises:
    setting the priority of an ad relating to an item identified for purchase higher than the priority of an ad related not to an item identified for purchase but to the POS location.

5. The method of claim 1, wherein the step of prioritizing multiple competing ads comprises:

setting the priority of an ad relating to the POS location higher than an ad relating not to the POS location but to the time of a transaction.

6. The method of claim 1, wherein the step of prioritizing multiple competing ads comprises:

setting the priority of an ad relating to the time of a transaction higher than the priority of an ad relating not to the time of a transaction but to the price of an item identified for purchase.

7. The method of claim 1, wherein the step of prioritizing multiple competing ads comprises:

setting the priority of an ad that has n times been determined as the ad for display higher than an ad that has been determined as the ad for display more than n times.

8. The method of claim 1, wherein the step of prioritizing multiple competing ads comprises:

adjusting the priority of an ad, the adjustment based on advertisement already displayed in the transaction.

9. The method of claim 1, wherein the step of prioritizing multiple competing ads comprises:

adjusting the priority of an ad for display when the transaction meets predetermined criteria, the ad with the adjusted priority having already been displayed, such that the ad with the adjusted priority does not display again in the transaction.

10. The method of claim 1, wherein the step of prioritizing multiple competing ads comprises:

randomly setting the priority of an ad, with priority equal to that of another ad, higher than the priority of the other ad.

11. The method of claim 1, wherein the additional information is derived from a database of consumer information.

12. The method of claim 1, wherein the additional information is demographic information associated with the consumer.

* * * * *

UNITED STATES PATENT AND TRADEMARK OFFICE
CERTIFICATE OF CORRECTION

| | | |
|---|---|---|
| PATENT NO. | : 7,734,475 B2 | |
| APPLICATION NO. | : 12/043591 | |
| DATED | : June 8, 2010 | |
| INVENTOR(S) | : Allan et al. | |

It is certified that error appears in the above-identified patent and that said Letters Patent is hereby corrected as shown below:

In Column 6, Line 2, delete "connect-ion" and insert -- connection --, therefor.

In Column 12, Line 16, delete "type-B" and insert -- type-8 --, therefor.

In Column 16, Line 8, delete "so," and insert -- so. --, therefor.

In Column 17, Line 27, delete "Tn" and insert -- In --, therefor.

In Column 20, Line 40, in Claim 1, after "ad," delete "and".

Signed and Sealed this
Seventh Day of August, 2012

David J. Kappos
*Director of the United States Patent and Trademark Office*